United States Patent [19]

Boufford

[11] Patent Number: 4,638,933
[45] Date of Patent: Jan. 27, 1987

[54] PORTABLE FRONT BIKE PACK ASSEMBLY

[75] Inventor: Richard Boufford, 1983 Westminster, Costa Mesa, Calif. 92627

[73] Assignee: Richard Boufford, Newport Beach, Calif.

[21] Appl. No.: 737,790

[22] Filed: May 28, 1985

[51] Int. Cl.⁴ .............................................. B67J 7/00
[52] U.S. Cl. ................................... 224/41; 224/30 A
[58] Field of Search ........... 280/289 A; 224/36, 30 A, 224/41, 39, 40, 31, 42

[56] References Cited

U.S. PATENT DOCUMENTS

| | | | |
|---|---|---|---|
| 612,646 | 10/1898 | Howell et al. | |
| 1,924,343 | 8/1933 | Andrews | 224/36 X |
| 2,492,595 | 12/1949 | Rhoer | 224/41 |
| 3,613,970 | 10/1971 | Humlong | 224/36 |
| 3,938,719 | 2/1976 | Carlton | 224/36 |
| 3,955,729 | 5/1976 | Montgomery | 224/36 |
| 4,056,219 | 11/1977 | Hine, Jr. | 224/36 |
| 4,066,196 | 1/1978 | Jackson et al. | |
| 4,260,086 | 4/1981 | Hine, Jr. et al. | |
| 4,313,548 | 2/1982 | Edelson | |
| 4,315,583 | 2/1982 | Hine, Jr. | 224/36 X |
| 4,440,332 | 4/1984 | Kullen | |

Primary Examiner—Stephen Marcus
Assistant Examiner—Robert Petrik

[57] ABSTRACT

The front pack in support assembly for detachable connection to the gooseneck and handlebar intersections of the bicycle frame is disclosed. The assembly comprises a pack having support engaging members mounted on an outer surface thereof, and a plurality of rigid pack supports in rotatable engagement with the support engaging members. The pack supports have portions adapted for overlapping engagements about the gooseneck and handlebar intersection of the bicycle frame. The pack support members are rotatable within the support engaging members to permit disengagement from the gooseneck and handlebar disengagement from the bicycle frame, and orientation of the pack supports in substantially parallel relation adjacent to the pack outer surface.

14 Claims, 4 Drawing Figures

PORTABLE FRONT BIKE PACK ASSEMBLY

The present invention relates to packs for mounting on a bicycle. More particularly, the invention relates to an integral pack and frame assembly that may be detachably mounted on the bicycle frame.

A variety of different types of bicycle packs have long been available to the cyclist. Packs are typically mounted on frame members that may fit on front or rear portions of the bicycle and may require relatively permanent mounting to the bicycle frame.

More recently, a number of bicycle pack assemblies have been proposed wherein the pack is detachably mounted to a frame member that is permanently or detachably secured to the bicycle frame. Such constructions advantageously permit the cyclist to remove the pack from the bicycle and carry it to locations where it is inconvenient to bring the bicycle.

Frames adapted to cooperate with such detachable packs are typically either detachably mounted to the bicycle, or more permanently secured to the bicycle frame. Though detachable frames are easily mounted, without the need for tools, they must be carried with the bicycle pack or left on the bicycle frame from which they may be easily stolen. Though permanently mounted frames are not as susceptible to theft, the need to use tools to secure them to the bicycle renders them less convenient and less desirable to many cyclists. Accordingly, there exists the need for a detachably mounted bicycle pack assembly in which the pack mounting members are easily detached from the frame and are conveniently stored integral to the portable, pack without the need for dedicated storage space interior to the pack.

SUMMARY OF THE INVENTION

The front pack in support assembly for detachable connection to the gooseneck and handlebar intersections of the bicycle frame is disclosed herein. The assembly comprises a pack having support engaging members mounted on an outer surface thereof, and a plurality of rigid pack supports in rotatable engagement with the support engaging members. The pack supports have portions adapted for overlapping engagements about the gooseneck and handlebar intersection of the bicycle frame. The pack support members are rotatable within the support engaging members to permit disengagement from the bicycle frame, and orientation of the pack supports in substantially parallel relation adjacent the pack outer surface.

The pack supports and support engaging members may be permanently fixed to an outer surface of the pack and the entire assembly may be readily removed from the bicycle frame and transported.

The assembly may further include a tensioning member coupled to the pack and engageable to the bicycle frame so as to prestress the pack supports into engagement with the bicycle frame. The tensioning member may also be readily transportable with the assembly and may serve to secure the pack supports in position adjacent the pack outer surface.

DETAILED DESCRIPTION OF THE PREFERRED EMBODIMENT

Figure 1:
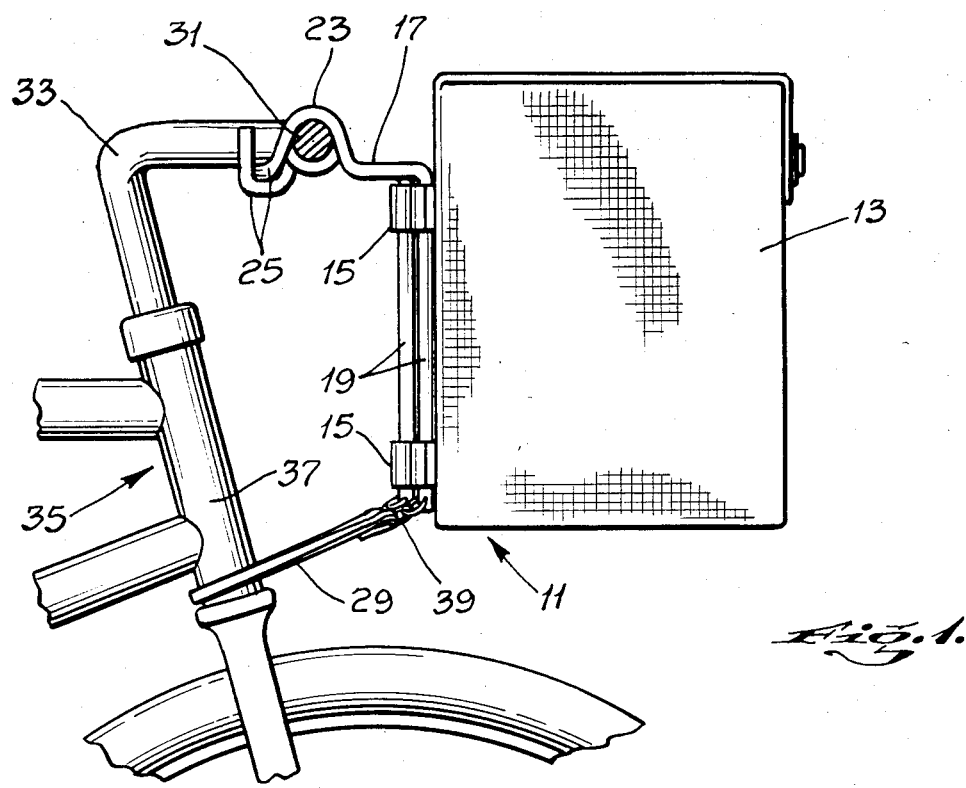
FIG. 1 is a side view of the front bike pack assembly mounted to a bicycle.
Figure 3:
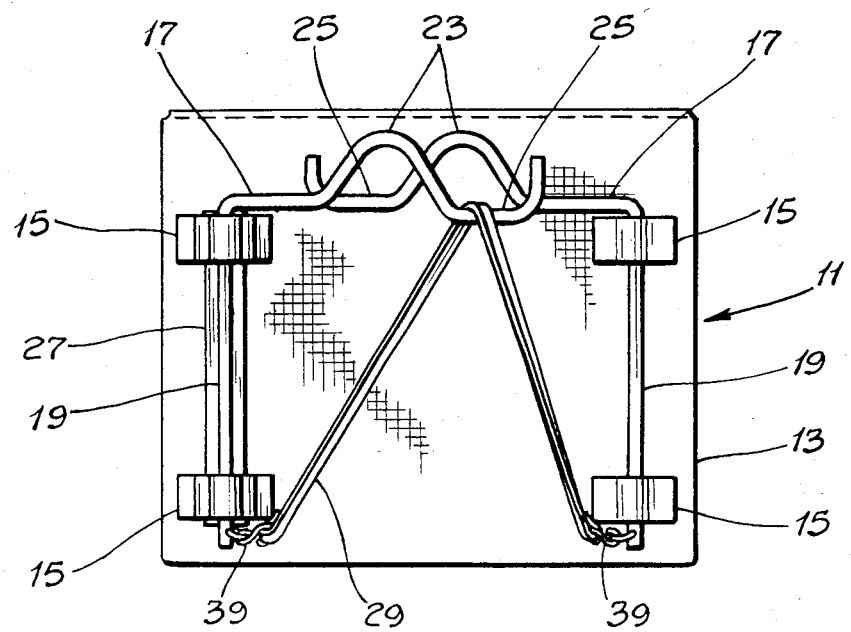
FIG. 3 is a rear view of the front bike pack assembly detached from the bicycle.
Figure 4:
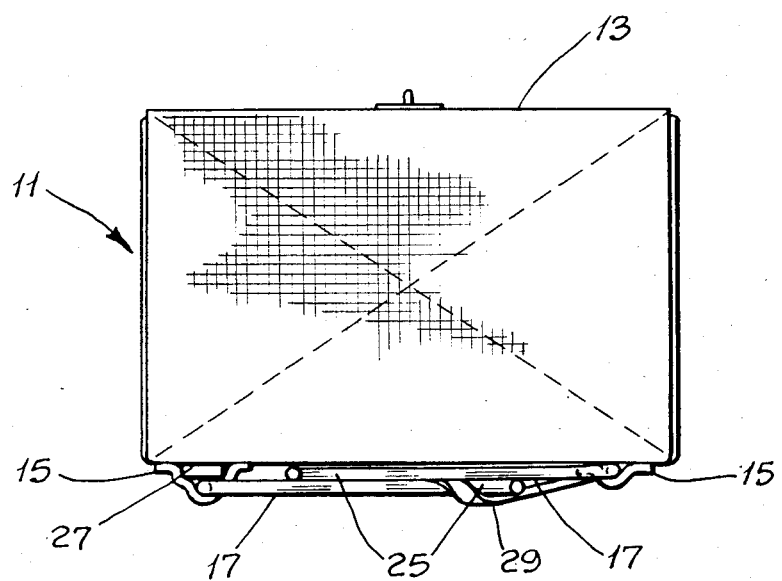
FIG. 4 is a top view of the front bike pack assembly as detached from the bicycle.

Referencing FIG. 1 of the drawings wherein the presently preferred embodiment of the invention is illustrated, a front pack and support assembly 11 is shown connected to a bicycle frame 35. The assembly 11 includes a pack 13, rigid pack supports 17, and pack support engaging members 15. The pack support engaging members 15 are preferably permanently mounted to a surface of the pack 13. The pack supports 17 are rotatably mounted within the support engaging members 15 to facilitate engagement to the bicycle frame 35, as well as folding to produce an easily transportable structure, as illustrated at FIGS. 3 and 4. Thus, the invention provides an integral pack and frame assembly that can easily be attached to and detached from the bicycle assembly, and folded into an easily transportable assembly without the need for any tools whatsoever. Moreover, the advantages provided by the present invention may be realized with virtually any model bicycle currently available.

Exemplary bicycle frame 35 is illustrated having a steering column 37, a gooseneck 33, and handlebar 31. Pack supports 17 include a first curved segment 23 adapted to extend over handlebar 31, and second curved segments 25 adapted to overlap under gooseneck 33. The overlapping of segments 25 is more clearly illustrated in connection with FIG. 2. Tensioning member 29 is coupled to the pack 13 via coupling links 39 and the support engaging members 15. It is envisioned that coupling links 39 may be detachably connected to the support engaging members 15 to permit ready attachment of tensioning member 29 to the bicycle frame 35.

It is to be understood that the tensioning member 29 may be connected to various portions of the bicycle frame and that the pack supports 17 may be formed to have a different shape that may provide an alternative manner of attachment to the bicycle frame 35.

Figure 2:
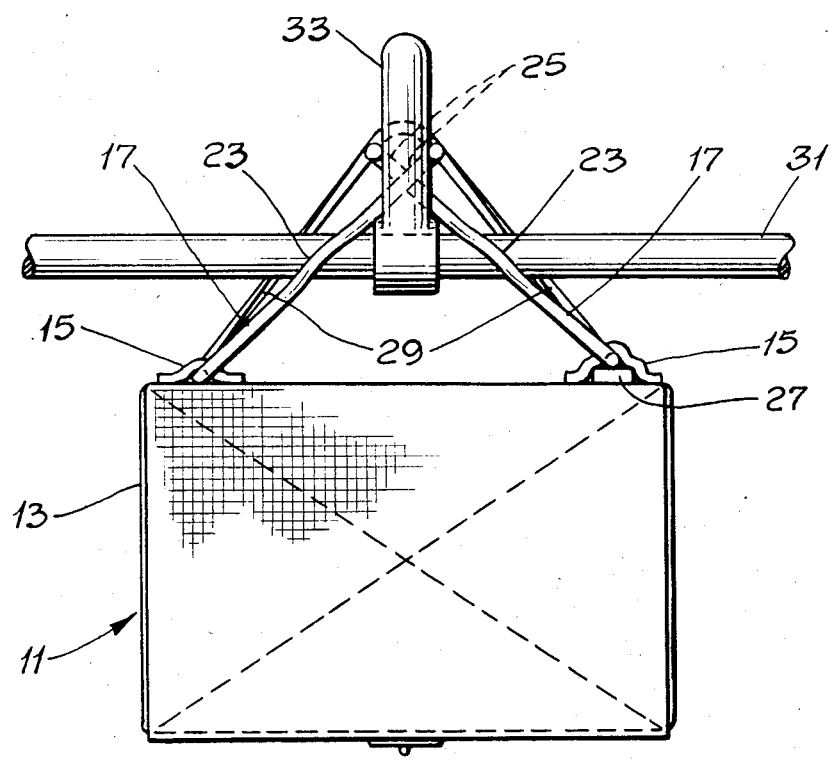
FIG. 2 is a top view of the front bike pack assembly mounted to a bicycle.

As shown at FIG. 2, one of the pack supports 17 is preferably offset from the back surface of pack 13 by spacer 27. That offset facilitates folding of the pack supports 17 to orient the supports 17 such that the respective portions thereof are disposed in substantially parallel relation adjacent to the pack outer surface. Spacer 27 is further illustrated in connection with FIGS. 3 and 4 that illustrate the front pack and support assembly as detached from the bicycle frame 35 and folded up for use as a camera or shoulder bag.

It is also illustrated at FIGS. 3 and 4 tensioning member 29 may be disconnected from the bicycle frame 35 and used to retain the pack supports 17 adjacent the surface of pack 13. It is also anticipated that alternative retention means may be used to keep pack supports 17 in the orientation illustrated at FIGS. 3 and 4. In one such alternative assembly, spring clips may be provided on the surface of pack 13 and adapted for engagement of spring clips (not shown) and may be provided on the back surface of pack 13 and adapted for engagement to the pack supports 17. In another alternative construction, the pack supports 17 and support engaging members 15 may be cooperative to lock the pack supports in their folded position as illustrated at FIGS. 3 and 4.

As shown at FIG. 3, portions 25 of pack supports 17 do not extend to the same elevation on each pack support. Portion 25 on one of the pack supports 17 extends lower than the corresponding portion on the other pack support 17. That arrangement permits the two supports 17 to overlap under the gooseneck 33, as illustrated at FIGS. 1 and 2.

It is also anticipated that pack supports 17 may be mounted on the side surfaces of pack 13, rather than the back surface. Such a construction would, however, require a different shape for the pack supports 17. It is anticipated that although such alternative constructions would be less advantageous than the illustrated embodiment, the principal features and advantages of the present invention, i.e., provision of an integral frame and pack assembly that can be conveniently attached and detached from the bicycle frame, may still be implemented.

Other modifications and additions to the present invention may be disclosed herein, may also be made without departing from the spirit and scope of the invention which is defined by the appended claims.

What is claimed is:

1. Front pack and support assembly for detachable connection to the gooseneck and handlebar intersection of a bicycle frame comprising:
   (a) a pack having support engaging members mounted on an outer surface thereof; and
   (b) a pair of independently rotatable rigid pack supports, each of said pack supports having first portions adapted to rotatably engage said pack support engaging members and second portions adapted for overlapping engagement about the gooseneck and handlebar intersection of a bicycle, each of said second portions being independently rotatable between a first position along the surface of the pack and a second position wherein said second portions extend from the surface of the pack for engagement about the gooseneck and handlebar intersection of the bicycle.

2. The assembly as recited in claim 1 wherein said second portions are disposed substantially perpendicular to said first portions.

3. The assembly as recited in claim 1 wherein said second portions include first curved segments adapted to extend over said handlebar, and second curved segments adapted to overlap under the gooseneck.

4. The assembly as recited in claim 3 wherein the second segment of one of said support members extends lower than the second segment of the other of said pack support members.

5. The assembly as recited in claim 1 wherein said support engaging members are mounted on the backside of said pack, facing the gooseneck and handlebar intersection.

6. The assembly as recited in claim 1 including a pair of support engaging members.

7. The assembly as recited in claim 6 wherein one of said engaging members extends further from the outer surface of said pack than the other of said support engaging members.

8. The assembly as recited in claim 1 further including a tensioning member coupled to said pack and engageable with the bicycle frame.

9. The assembly as recited in claim 1 wherein said pack support members are rotatable within said support engaging members, such that said second portions may be disengaged from said gooseneck and handlebar intersection and disposed in substantially adjacent parallel relation adjacent to said pack outer surface.

10. The assembly as recited in claim 9 further including a tensioning member connectable to said support members for securing said second portions in substantially adjacent parallel relation adjacent to said pack outer surface.

11. The assembly as recited in claim 10 wherein said tensioning member includes end portions connected to said support member first portions, and a central portion engaging at least one of said pack support second portions.

12. A front pack and support assembly for detachable connection to the gooseneck and handlebar intersection of a bicycle frame comprising:
   (a) a pack having support engaging members mounted on an outer surface thereof facing the bicycle gooseneck; and
   (b) a pair of rigid pack supports, said pack supports being disposed in rotational engagement with said support engaging members, said pack supports being independently disposable in a first position substantially against the surface of the pack, and a second position wherein said pack supports extend from the surface of the pack, said pack supports being shaped to permit engagement about the bicycle gooseneck and handlebar when said supports are disposed in said second position.

13. The Assembly as recited in claim 12 wherein said pack supports are further adapted for mutual overlapping engagement with each other about the bicycle gooseneck and handlebar intersection when the pack supports are disposed in said second position.

14. A front pack and support assembly for detachable connection to the gooseneck and handlebar intersection of a bicycle frame comprising:
   (a) a pack having support engaging members mounted on an outer surface thereof facing the bicycle gooseneck; and
   (b) a pair of rigid pack supports, each of said pack supports having vertical portions disposed in rotational engagement with said support engaging members, and horizontal portions, said horizontal portions each being variably disposable in a first horizontal position substantially against the surface of the pack, and a second position extending from the surface of the pack, said horizontal portions being shaped to permit engagement with the gooseneck and handlebar intersection when disposed in said second position.

* * * * *